US008000475B1

(12) United States Patent
Guman (10) Patent No.: US 8,000,475 B1
(45) Date of Patent: Aug. 16, 2011

(54) SYSTEM AND METHOD FOR ENCRYPTING AND MODULATING VIDEO STREAMS

(75) Inventor: Ron Guman, Zichron-Yaakon (IL)

(73) Assignee: Bigband Networks Inc., Redwood City, CA (US)

( * ) Notice: Subject to any disclaimer, the term of this patent is extended or adjusted under 35 U.S.C. 154(b) by 840 days.

(21) Appl. No.: 10/746,616

(22) Filed: Dec. 23, 2003

Related U.S. Application Data (60) Provisional application No. 60/466,359, filed on Apr. 28, 2003.

(51) Int. Cl.
*H04N 7/167* (2011.01)
(52) U.S. Cl. .............. 380/212; 380/31; 380/33; 380/34; 725/115
(58) Field of Classification Search .................... 380/31, 380/33, 34, 212; 725/115
See application file for complete search history.

(56) References Cited

U.S. PATENT DOCUMENTS

| | | | | |
|---|---|---|---|---|
| 4,964,162 A * | 10/1990 | McAdam et al. | ............. | 380/215 |
| 5,189,673 A * | 2/1993 | Burton et al. | .................. | 370/490 |
| 5,291,324 A * | 3/1994 | Hinterlong | ...................... | 398/54 |
| 5,319,707 A * | 6/1994 | Wasilewski et al. | ........... | 380/212 |
| 5,432,874 A * | 7/1995 | Muraguchi | ...................... | 385/24 |
| 5,557,541 A * | 9/1996 | Schulhof et al. | ................. | 700/94 |
| 5,594,490 A * | 1/1997 | Dawson et al. | .................. | 725/67 |
| 5,631,693 A * | 5/1997 | Wunderlich et al. | ............. | 725/91 |
| 5,708,961 A * | 1/1998 | Hylton et al. | .................... | 725/81 |
| 5,712,876 A * | 1/1998 | Yoshizawa et al. | ............ | 375/268 |
| 6,104,811 A * | 8/2000 | Aiello et al. | ..................... | 380/46 |
| 6,105,134 A * | 8/2000 | Pinder et al. | ................... | 713/170 |
| 6,138,261 A * | 10/2000 | Wilcoxson et al. | ........... | 714/755 |
| 6,157,679 A * | 12/2000 | Johnson | ......................... | 375/281 |
| 6,262,982 B1 * | 7/2001 | Donahue et al. | .............. | 370/352 |
| 6,356,638 B1 * | 3/2002 | Hardy et al. | ................... | 380/275 |
| 6,357,045 B1 * | 3/2002 | Devaney | ........................ | 725/138 |
| 6,434,141 B1 * | 8/2002 | Oz et al. | .......................... | 370/352 |
| 6,522,658 B1 * | 2/2003 | Roccanova | .................... | 370/441 |
| 6,567,981 B1 * | 5/2003 | Jeffrey | ............................. | 725/80 |
| 6,651,089 B1 * | 11/2003 | Stead | ............................. | 709/217 |
| 6,792,615 B1 * | 9/2004 | Rowe et al. | ...................... | 725/37 |
| 6,931,232 B1 * | 8/2005 | Wolcott | ......................... | 455/12.1 |
| 6,946,993 B2 * | 9/2005 | Seo et al. | ........................ | 342/374 |
| 6,968,394 B1 * | 11/2005 | El-Rafie | ......................... | 709/245 |
| 7,159,233 B2 * | 1/2007 | Son et al. | ......................... | 725/86 |
| 7,218,738 B2 * | 5/2007 | Pedlow et al. | ................. | 380/218 |
| 2001/0004768 A1 * | 6/2001 | Hodge et al. | .................... | 725/91 |
| 2001/0055358 A1 * | 12/2001 | Kondo | ........................... | 375/377 |
| 2002/0010641 A1 * | 1/2002 | Stevens et al. | .................. | 705/26 |
| 2002/0012495 A1 * | 1/2002 | Sasai et al. | ....................... | 385/24 |
| 2002/0087995 A1 * | 7/2002 | Pedlow, Jr. | ...................... | 725/87 |
| 2002/0146124 A1 * | 10/2002 | Farkas et al. | .................. | 380/255 |
| 2004/0100897 A1 * | 5/2004 | Shattil | ............................ | 370/206 |

\* cited by examiner

*Primary Examiner* — Edan Orgad
*Assistant Examiner* — James Turchen
(74) *Attorney, Agent, or Firm* — Reches Patents (57) ABSTRACT

A system and method for providing an encrypted media stream to clients includes a plurality of remote multiple media stream manager and provider (RMP) units to receive a plurality of source media streams. The RMP units modulate the source media streams to provide a plurality of modulated media streams; encrypt the modulated media streams to provide a plurality of encrypted and modulated media streams; de-modulate the encrypted and modulated media streams to provide a plurality of encrypted and demodulated media streams; and transmit the encrypted and demodulated media streams over a high speed network.

33 Claims, 6 Drawing Sheets

FIGURE 4 encrypting and modulating a first set of media streams, by encrypting modulators, to provide a first set of encrypted modulated media streams
510 demodulating the first set of encrypted modulated media streams to provide a first set of encrypted media streams.
520 converting the first set of encrypted media streams to provide a first set of converted encrypted media streams, multiplexing the first set of converted encrypted media streams to provide a first multiplexed stream; transmitting the first multiplexed stream over the first type network, de-multiplexing the first multiplexed stream to provide the first set of converted encrypted media streams, and re-converting the first set of converted encrypted media streams to provide a second set of encrypted media streams
530 modulating a second set of encrypted media streams, by a non-encrypting modulator, to provide a second set of encrypted modulated media streams, said second set of encrypted modulated media streams to be provided to the group of clients
540

SYSTEM AND METHOD FOR ENCRYPTING AND MODULATING VIDEO STREAMS

RELATED APPLICATIONS

This application is related to and claims the priority benefit of U.S. Provisional Application 60/466,359, filed Apr. 28, 2003, incorporated herein by reference.

FIELD OF THE INVENTION

The present invention relates generally to communication systems and, in particular, to a system and method for encrypting and modulating video streams.

BACKGROUND OF THE INVENTION

Conditional Access Systems

Two basic encryption methods are known in the art, the first is known as symmetrical encryption while the second is known as asymmetrical encryption. Symmetrical encryption is simpler than asymmetrical encryption but is less secure than the asymmetrical encryption. In symmetrical encryption each entity has the key for encrypting and decrypting messages to be sent to the other entity.

PKI (Public Key Infrastructure) encryption is an asymmetrical encryption method. In PKI systems each entity is assigned a key-pair consisting of a private key and a corresponding public key. The keys are usually multi-digit numbers represented in an appropriate digital form. The keys satisfy certain mathematical properties according to the specific public-key algorithm used. RSA, DH and DS are well known PKI methods.

PKI encryption is based upon the assumption that it is computationally easy to calculate the public key from a given private key, but it is extremely hard to calculate the private key given a public key.

Some public-key algorithms provide a method for encrypting a message using an entity's public key. An encrypted message can only be decrypted using that entity's corresponding private key and thus providing secrecy.

Conditional access systems and method are known in the art. Two known conditional access system are the PowerKey™ of Scientific Atlanta Inc. from Lawrenceville, Ga., USA and the VideoGuard® of NDS from the United Kingdom. VideoGuard utilizes smart cards, secured transmission of entitlement information to subscribers, and security algorithms. The PowerKey™ utilizes RSA algorithm. Other well known systems are provided by other vendors such as Nagravision from Switzerland.

Another method for facilitating conditional access is scrambling, which is similar to encryption but slightly differs, as encryption is digital at nature while scrambling is analog at nature. A well known scrambling algorithm is the DVS common scrambling algorithm.

U.S. Pat. No. 6,510,519 of Wasilewski, et al. and U.S. Pat. No. 6,424,717 of Pinder et al. describe a cable television system that provides conditional access to services. The system includes a Head-end that is connected to multiple set top boxes. The Head-end is able to broadcast encrypted media streams (i.e., service "instances" and "programs") that may be decrypted by the set top box using keys that are reassigned at different times thus minimizing piracy. The encryption and decryption utilize public keys and/or private keys. Clients purchase the right to decrypt an encrypted media stream (or media streams) for a limited time period. After said purchase their set top box receives authorization information that enables the set top box to decrypt the encrypted media stream (or media streams). Said authorization information is usually encrypted, for example by the public key of the set top box. The authorization information can be decrypted by the private key of the set top box that in turn may be stored within the set top box. The authorization information may include a private key of the media stream (or programs) or an indicator that determines which media streams the set top box may decrypt. The system of Wasilewski uses both symmetrical and asymmetrical encryption. The media streams are symmetrically encrypted while entitlement messages are asymmetrically encrypted.

Encrypting and Non-Encrypting Modulators

Information signals, such as data signals, media signals and especially compressed video and audio streams and more especially packetized audio and media streams propagate over various communication channels, such as but not limited to terrestrial, wireless, satellite and cable communication channels. Media streams usually include large amounts of information.

Digital transmission and compression techniques allow for transmitting media signals over communication channels in a compressed form. The Moving Pictures Experts Group (MPEG) specifications are standardized methods for compressing and transmitting media signals such as video and audio.

Typically, media packets are provided to distribution systems that include Head-ends, primary hubs, secondary hubs and nodes and then are transmitted over communication networks to the clients. U.S. patent applications 2002/0188953 A1 of Kenworthy and U.S. patent application 2002/0162114 A1 of Bisher, Jr. et al are believed to provide an adequate description of some state of the art distribution systems. Kenworthy describes a distribution system that includes a centralized aggregation Head-end, multiple interconnected terrestrial fiber optic networks, local and/central offices and last mile network. Bisher Jr. describes a system that is able to multicast and unicast packets to clients.

Some media packets can pass through more than one entity out of said Head-end, hubs and nodes. In order to transmit the media packets over portions of the distribution system they are modulated in various manners known in the art. In order to be transmitted over the portion of the distribution system that is directly connected to the clients, the media packets must be modulated in a certain manner.

This certain modulation is implemented by modulators that may be located within said entities. A typical modulator is a Quadrature Amplitude Modulation (QAM) modulator, although other modulators, such as QPSK modulators, are known in the art. QPSK modulation is more robust than QAM modulation but is slower. It is noted that QPSK modulation may be used for modulating upstream information.

A QAM modulator usually receives input signals and outputs a modulated signal over an Intermediate Frequency (IF) carrier or Radio Frequency (RF) carrier. A QAM modulator that is able to produce IF signals is followed by an up-converter that converts the IF signal to an RF signal. An exemplary distribution system that includes modulators and up-converters is described in U.S. patent application 2003/0037123 of Hoang. RF outputting QAM modulators are analogues to IF outputting QAM modulators that are connected to up-converters. For convenience of explanation the following description refers to RF outputting QAM modulators, but it applies also to IF QAM modulators that are connected to up-converters.

QAM modulators are able to alter the carrier frequency within a predefined frequency range. The modulators are arranged in arrays that are also known in the art as multi-modulators. Multi-modulators provide multiple modulated output signals. Modulated signals that are spaced apart in the frequency domain can be combined. Typically, each modulator outputs an output channel that has a bandwidth of 6 Mhz. The 6 Mhz channel can be used to convey a single analog television channel or ten MPEG compliant television channels. Typically, downstream channels are in the 50-750 Mhz band while upstream channels are in the 5-40 Mhz band.

A QAM modulator (as well as other types of modulators) is also able to perform additional processing steps such as conditional access operations (including encryption), error correction coding, interleaving and the like. The conditional access operations include encryption but may also include authentication, digital signature, certification and the like. Conditional access operations facilitate selective viewing of media streams. End-users are required to pay additional fees in order to view encrypted media streams.

Today, QAMs that are also able to perform conditional access operations (encrypting QAMs) are much more expensive than QAMs that are not able to perform conditional access operations (non-encrypting QAMs).

Switched Broadcast

Communication channels that are connected to clients have a limited bandwidth, said limitation is known in the art as the "last mile problem". Accordingly, only a certain amount of services can be provided to clients over said limited bandwidth channels. The amount of services is especially limited when some of them are bandwidth consuming.

It is noted that the bandwidth limited networks are known in the art as broadband networks, but said title mostly emphasizes the much larger bandwidth these communication networks have (usually about 750 Mhz) in comparison to even more bandwidth limited communication networks and technologies, such as Plain Old Telephone Networks, dial-in modems and the like.

Clients are grouped in service groups. A service group includes a plurality of clients, such as set top boxes, cable modems and the like, that receive the same multiplexed downstream signal ('downstream' means from service provides to a client, while 'upstream' means information transmitted from the clients) as they share the same communication link/output port of a node, hub or even a Head-end. A service group is also known in the art as a "forward carrier path".

Typically, media packets are provided to Head-ends, primary hubs, secondary hubs and nodes and then are transmitted over communication networks to the clients. Some media packets can pass through more than one entity out of said Head-end, hubs and nodes.

Switched broadcast enables each service group to receive a unique multiplex downstream signal. The multiplex downstream signal may be responsive to requests from the members of that service group, their viewing patterns, priorities and many other parameters.

As each service group can receive a unique multiplex downstream signal, each service group has to be connected to multiple encrypting-QAMs. Thus the amount of data requiring encryption by QAMs is much higher than in distribution systems that do not allow switched broadcast, but rather broadcast substantially the same multiple downstream signal to all service groups. (In the latter case—few encrypting QAMs were usually located at a Head-end and were used to modulate a relatively limited amount of media streams).

As a rule of thumb, a head-end serves about one million end-users, a service group serves about two thousand end-users. About three hundred media streams are output by a head-end and about two hundred media streams out of the three hundred media streams can be provided to each service group. A typical encrypting QAM is able to manage ten digital media streams. In non-switched broadcast scenarios thirty encrypting QAMs service one million end-users. In a switched broadcast scenario twenty encrypting QAMs service a service group, thus about one thousand are needed to serve five hundred service groups that include one million end-users.

SUMMARY OF THE INVENTION

The system comprises a plurality of remote multiple media stream manager and provider (RMP) units to receive a plurality of source media streams. The plurality of RMP units modulate the plurality of source media streams to provide a plurality of modulated media streams; encrypt the plurality of modulated media streams to provide a plurality of encrypted, and modulated media streams; de-modulate the plurality of encrypted, and modulated media streams to provide a plurality of encrypted and demodulated media streams; and transmit the plurality of encrypted and demodulated media streams over a high speed network. The method comprises providing a plurality of source media streams to a plurality of remote multiple media stream manager and provider (RMP) units. The plurality of source media streams are modulated to provide a plurality of modulated media streams. The plurality of modulated media streams are encrypted to provide a plurality of encrypted, and modulated media streams. De-modulating the plurality of encrypted, and modulated media streams, provides a plurality of encrypted and demodulated media streams. The plurality of encrypted and demodulated media streams are transmitted over a high speed network.

BRIEF DESCRIPTION OF THE DRAWINGS

The present invention will be understood and appreciated more fully from the following detailed description taken in conjunction with the drawings in which.

DETAILED DESCRIPTION

A system and method for encrypting and modulating video streams is described. In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, etc.), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

One embodiment of the present system provides encrypted media streams to a group of clients, the system includes: (i) multiple encrypting modulators for encrypting and modulating a first set of media streams to provide a first set of encrypted modulated media stream; (ii) multiple de-modulators, coupled to the multiple encrypting modulators, for demodulating the first set of encrypted modulated media streams to provide a first set of encrypted media streams; (iii) multiple selection means, coupled between the multiple de-modulators and multiple non-encrypting modulators, for providing the multiple non-encrypting modulators a second set of encrypted media streams; and (iv) multiple non-encrypting modulators for modulating the second set of encrypted media streams, to provide a second set of encrypted modulated media streams, said second set of encrypted modulated media streams to be provided to the group of clients.

One embodiment of the present system provides an encrypted media stream to a group of clients, the system includes: (i) an encrypting modulator, for receiving a media stream, encrypting and modulating the received media stream to provide a first encrypted modulated media stream; (ii) a de-modulator, coupled to the encrypting modulator, for demodulating the encrypted modulated media stream to provide an encrypted media stream; and (iii) a non-encrypting modulator, coupled to the de-modulator, for modulating the encrypted media stream, to provide a second encrypted modulated media stream to be provided to a client.

One embodiment of the present method provides for encrypting media streams to a group of clients, the method includes: (i) encrypting and modulating a first set of media streams, by encrypting modulators, to provide a first set of encrypted modulated media stream; (ii) demodulating the first set of encrypted modulated media streams to provide a first set of encrypted media streams; and (iii) modulating a second set of encrypted media streams, by a non-encrypting modulator, to provide a second set of encrypted modulated media streams, said second set of encrypted modulated media streams to be provided to the group of clients.

One embodiment of the present method provides for encrypting media streams to a group of clients, the method includes: (i) receiving a media stream; (ii) encrypting and modulating the media stream, by an encrypting modulator, to provide a first encrypted modulated media stream; (iii) demodulating the encrypted modulated media stream to provide an encrypted media stream; and (iv) modulating the encrypted media stream, by a non-encrypting modulator, to provide a second encrypted modulated media stream to be provided to a client.

A system and method for encrypting media streams with a smaller amount of encrypting QAMs are provided. According to an embodiment of the invention encrypting QAMs are located at the head-end and encrypt and QAM modulate media streams.

According to one embodiment, a remote entity is connected over first type (usually very high bandwidth) networks to multiple local entities that in turn are connected over access networks (such as HFC networks) to clients. Conditional access is facilitated by encrypting media streams and providing encrypted conditional access that enables decryption of said encrypted media streams.

The terms "program" and the term "media stream" are both used synonymously as examples of information sessions. It is noted that the information sessions may include data, multiple media streams, program portions and the like.

Figure 1:
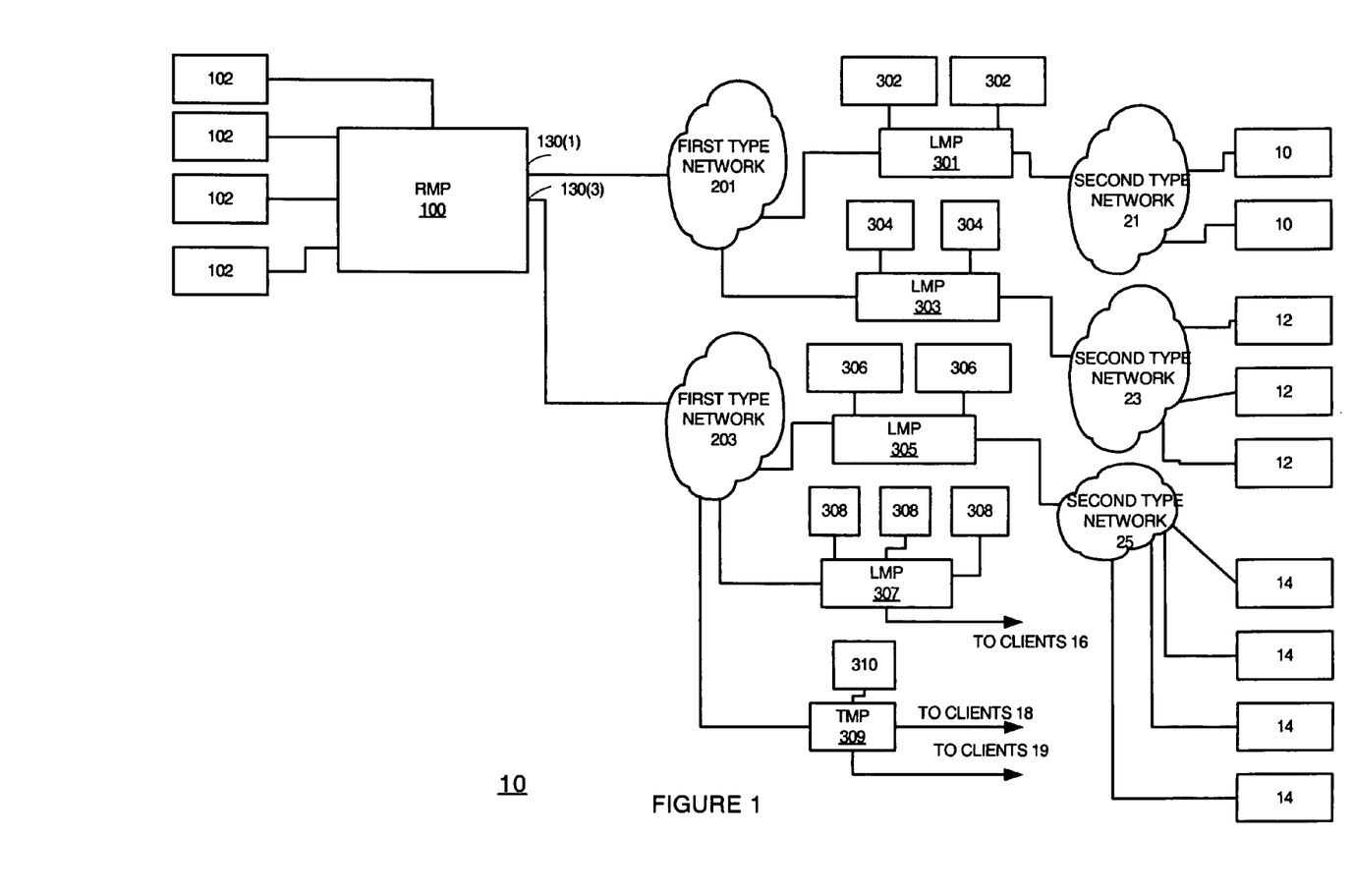
FIG. 1 illustrates a dual tier distribution system, in accordance to an embodiment of the invention.

FIG. 1 illustrates a dual tier distribution system 10 that includes: first tier media sources 102, an second tier media sources 302, 304, 306, 308 and 310; remote multiple media stream manager and provider (RMP) 100; local multiple media stream managers and providers (LMPs) 301, 303, 305, 307 and 309; first type networks 201 and 203, and second type network 21, 23 and 25.

RMP 100 is connected to media providers 102 and to LMPs 301, 303, 305 and 307 via first type networks 201 and 203. RMP 100 may also be connected to clients or even directly to LMPs but this is not common.

LMP 301 is connected to output port 130(1) of RMP 100 via first type network 201, media sources 302 and is further connected to clients 10 via second type network 21. First type network 203 connects between output ports 130(3) of RMP 100 to LMPs 305, 307 and 309. LMP 303 is further connected to media sources 304 and to clients 12 via second type network 23. LMP 305 is further connected to media sources 306 and to clients 14 via second type network 25. LMP 307 is further connected to media sources 308 and to clients 16 via another second type network (not shown). LMP 309 is further connected to media sources 310 and to clients 18 and 19 via a further second type network (not shown).

Second type networks 21-25 are able to convey to clients output signals within a predefined frequency range. Today, this spectrum ranges between 0-870 Mhz. The 0-50 Mhz range is allocated for upstream traffic, while the remaining 50-870 Mhz range is allocated for downstream traffic. Usually, RMP 100 and LMPs 301-309 are able to exchange signals having a larger (and even much larger) spectrum over first type networks.

It is noted that in addition to encrypted media streams the conditional access requires a transmission of conditional access information, such as but not limited to authorization information. There are various well known manners to transmit said information, such as by using the same channels, and/or the same modulation as the encrypted media stream, by using different modulation and at least different channels than the encrypted media stream and the like. It is noted that in some cases out of band networks and QPSK modulations are used to transmit said information to clients. An exemplary manner for transmitting said information is illustrated in U.S. Pat. No. 6,510,519 of Wasilewski that is incorporated herein by reference.

It is noted that the number of clients that are connected to each second type network, as well as the number of clients per service group well exceeds the number of clients that are illustrated at FIG. 1. It is further noted that systems may have more than two tiers, or a single tier, as well as different entities per tier.

First type networks 201 and 203 are usually characterized by a bandwidth that well exceeds the bandwidth of the multiplexed signal that is eventually provided to clients. These networks may be configured in various manners, such as a mesh, star and ring configuration and can also support various communication protocols, such as Asynchronous Transfer Mode, Frame Relay, Ethernet, Gigabit Ethernet, SONET, WDM, packet switched WDM and the like. Those of skill in the art will appreciate that the distribution system may include redundant communication links and entities for increasing the robustness of the distribution system.

LMPs 301, 303, 305, 307 and 309 can replace or modify modulated signals from RMP 100 with their own modulated signals. For example, LMP 301 can modulate media signals from media providers 302 and replace some modulated signals from RMP 100, especially modulated signals that are not to be provided to the clients that are connected to LMP 301. The replacement is based upon a knowledge of the carrier frequency of the modulated signals to be replaced and can be implemented by radio frequency add/drop circuitry. It is noted that the add/drop circuitry may include variable or fixed filters as well as combiners. It is further noted that at least the drop operation may be implemented in the optical domain.

Figure 2:
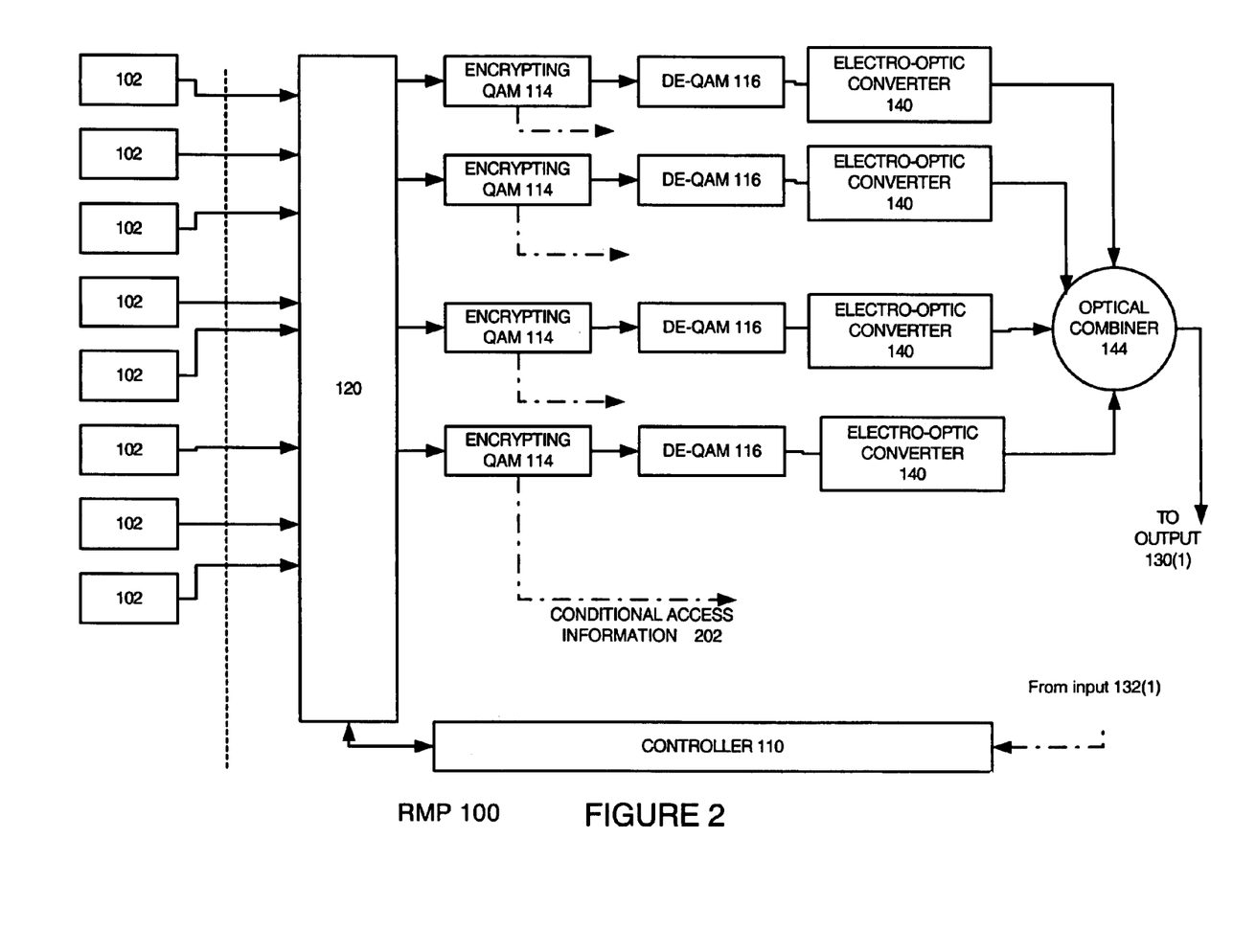
FIG. 2 illustrates a portion of a remote multiple media stream manager and provider (RMP) in accordance to an embodiment of the invention.

As illustrated by FIGS. 1 and 2, RMP 100 has multiple output ports, such as output ports 130(1), and 130(3) and further includes a controller 110, router/switch 120, multiple encrypting QAM modulators 114, QAM de-modulators ("DE-QAMs") 116, electro-optic converters 140 and optical combiner 144. Controller 110 controls and coordinates the various components of RMP 100. Router/switch 120 is connected between multiple media sources 102 and encrypting QAM modulators 114. It is noted that some encrypting QAM modulators 116 may be broadcast modulators, while others are narrowcast QAM modulators.

A modulated media stream can be provided to multiple outputs of RMP 100 by either duplicating the media stream prior to the modulation and then feeding it to multiple encrypting QAM modulators, by splitting an encrypted media stream or even an encrypted and modulated media stream or by a combination of both. For example, a broadcast encrypting QAM modulator may include multiple encrypting QAM modulators that receive the same feed.

As illustrated in FIG. 2, media streams are provided to encrypting QAMs 114 to be encrypted and QAM modulated to provide encrypted modulated media streams that are carried over RF carries. The encrypted modulated media streams are provided to QAM de-modulators 116 to provide encrypted media streams. Conveniently, the encrypted media streams are not carried over an IF or RF carrier. The encrypted media streams are electro-optically converted, by electro-optic converters 140 and them combined by optical combiner 144 to be provided out of output port 130(1) and be transmitted over first type network 201.

It is noted that FIG. 2 illustrates only a portion of RMP 100, and additional switches/routers as well as other modulators, de-modulators converters and the like may be used to provide output signals via input port 130(1) or other input ports of RMP 100.

According to an exemplary embodiment of the invention the media streams are MPEG compliant, the converter receives MPEG transport streams and converts them to Gigabit Ethernet compliant light signals.

Input port 132(1) of RMP 100 receives upstream information. The upstream information may be transmitted to communication links and networks that resemble the downstream path but usually have a much smaller bandwidth, but this is not necessarily so. The upstream information includes requests of clients to receive downstream media streams or may include a representation or an analysis of client requests, said representation or analysis being generated by second or third tier entities. For example, assuming that clients 14 request to view a certain television program (i.e., media stream). The entity of these clients are usually irrelevant to RMP 100, that is more interested in the overall requests generated by members of the service group that includes clients 14.

According to an aspect of the invention RMP 100 is able to determine which media streams to provide to LMPs 301-309 in response to various parameters such as the identity of the media stream, the media streams priority, a relationship between at least two media streams, bandwidth utilization, quality of service requirements and the like. LMPs 301-309 are able to determine which media streams to provide to their clients in response to the parameters and to various parameters reflecting the clients that are connected to them such as the status (request to view a media stream, reception of a media stream, set top box turned on or off, and the like) of at least one client or group of clients, a current status of at least one client, clients behavior patterns, and the like.

It is noted that the media streams are usually provided in response to a request to view a media stream being initiated by a client, said request may be generated by various manners, such as in response to a display of an electronic service guide, a surfing channel that cycles through available media streams, a surfing mosaic displaying accessible services; and/or a menu of accessible services.

RMP 100 may respond to the upstream information by routing a media stream to a certain modulator or even by dropping a media stream. The response reflects (i) a mapping between QAM modulators 112 and the clients that are connected to RMP 100, and (ii) the requests from various groups of service to receive said media stream. Said routing is preceded by a step (executed by a management entity) of determining which media streams are provided to which QAM modulator and by a configuration of switch/router 120 to support said determination.

In accordance with an embodiment of the invention, LMP 301 includes optical drop circuitry, for preventing selected media streams from being transmitted via second type network 21 to clients 10. LMP 301 also includes optical to electrical converters, non-encrypting QAM modulators, and a controller. LMP 301 further includes upstream circuitry for receiving upstream transmission from clients 10, either via second type network 21 or via an out of band network (not shown) and further for upstream transmitting information to RMP 100. The upstream transmission circuitry may include modulators, de-modulators, transmitters, receivers, and a controller. The controller usually includes MAC capabilities for managing the upstream transmission over usually relatively limited capability upstream links.

Figure 3:
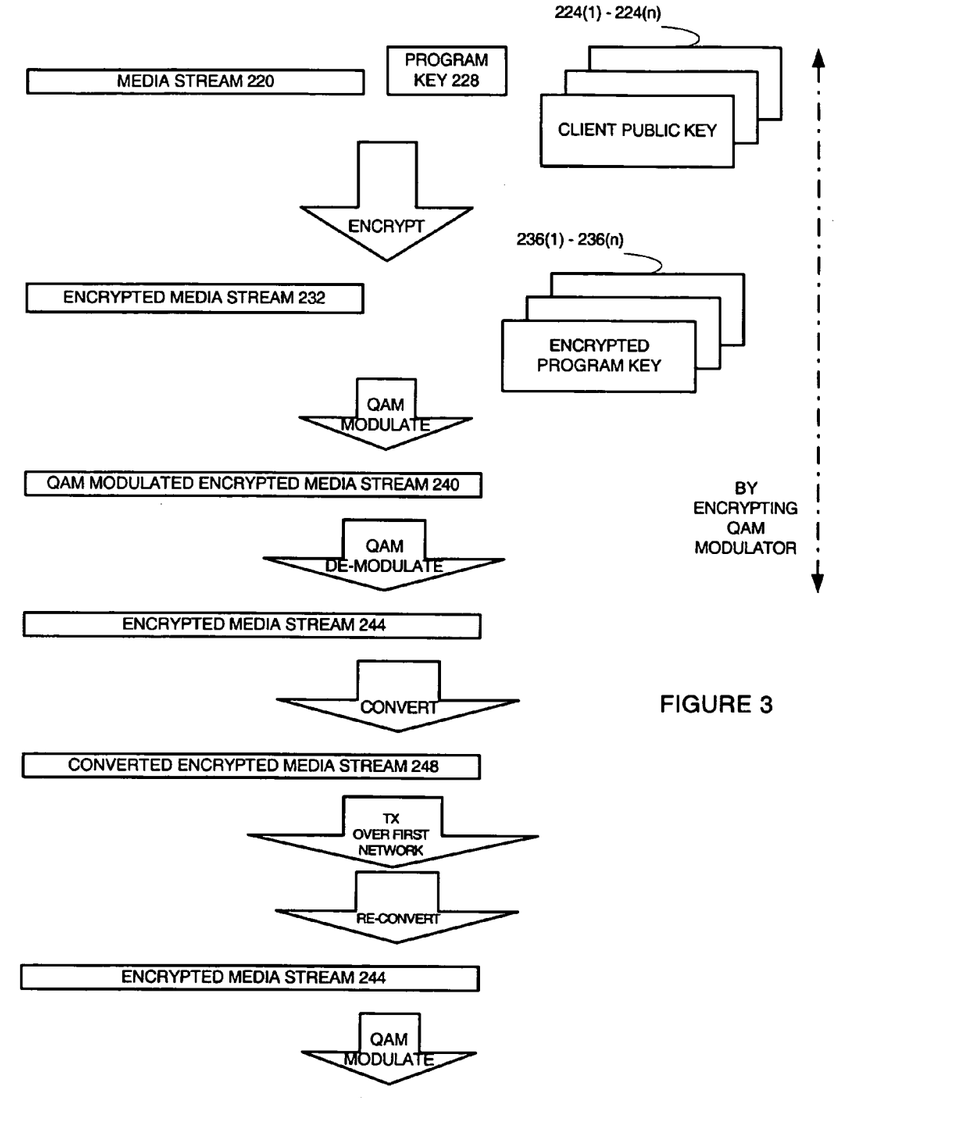
FIG. 3 is a schematic description of a single media stream and various associated data fields and the manner they are processed, in accordance with an embodiment of the invention.

FIG. 3 illustrates a single media stream and various associated data fields and the manner they are processed, in accordance with an embodiment of the invention. The process starts by receiving a media stream 220, a program key 228 and multiple public keys of clients 224(1)-224(n). It is assumed that these clients are entitled to decrypt the media stream 220. The program key 228 is used to encrypt media stream 220 to provide encrypted media stream 232. The program key is encrypted by client public keys 224(1)-224(n) to provide encrypted program key 236(1)-236(n).

The encrypted media stream 332 is QAM modulated to provide a QAM modulated encrypted media stream 240. Said encryption and QAM modulation are executed by an encrypting QAM. The encrypting QAM outputs the QAM modulated encrypted media stream 240 to a QAM de-modulator that in turn provides an encrypted media stream 244. The encrypted media stream 244 is converted (for example electro-optical conversion) in a manner that allows transmission over first type network to LMPs to provide a converted encrypted media stream 248. The media stream is transmitted over a first type network 201 to be received at an LMP 301, re-converted to provide encrypted media stream 244. The encrypted media stream 244 is QAM modulated by a non-encrypting QAM modulator to allow transmission over second type network to a client.

For simplicity of explanation the processing and transmission of encrypted program keys 236(1)-236(n) is not shown. It is noted that they may be embedded within the encrypted media stream or otherwise be transmitted along the same networks, but this is not necessarily so and they may be transmitted via other networks, such as out of band networks, or in another manner known in the art.

It is further noted that FIG. 3 illustrates a single media stream and does not illustrate the transmission of multiple media streams from RMP 100 to LMP 301 and the add/drop/replace operations that are executed by LMPs. A method for selective provisioning of services to end users is described in U.S. patent application Ser. No. 09/841,579, entitled "Method and System for providing multiple services to end-users", filed 23 Apr. 2001 which is hereby incorporated by reference.

Figure 4:
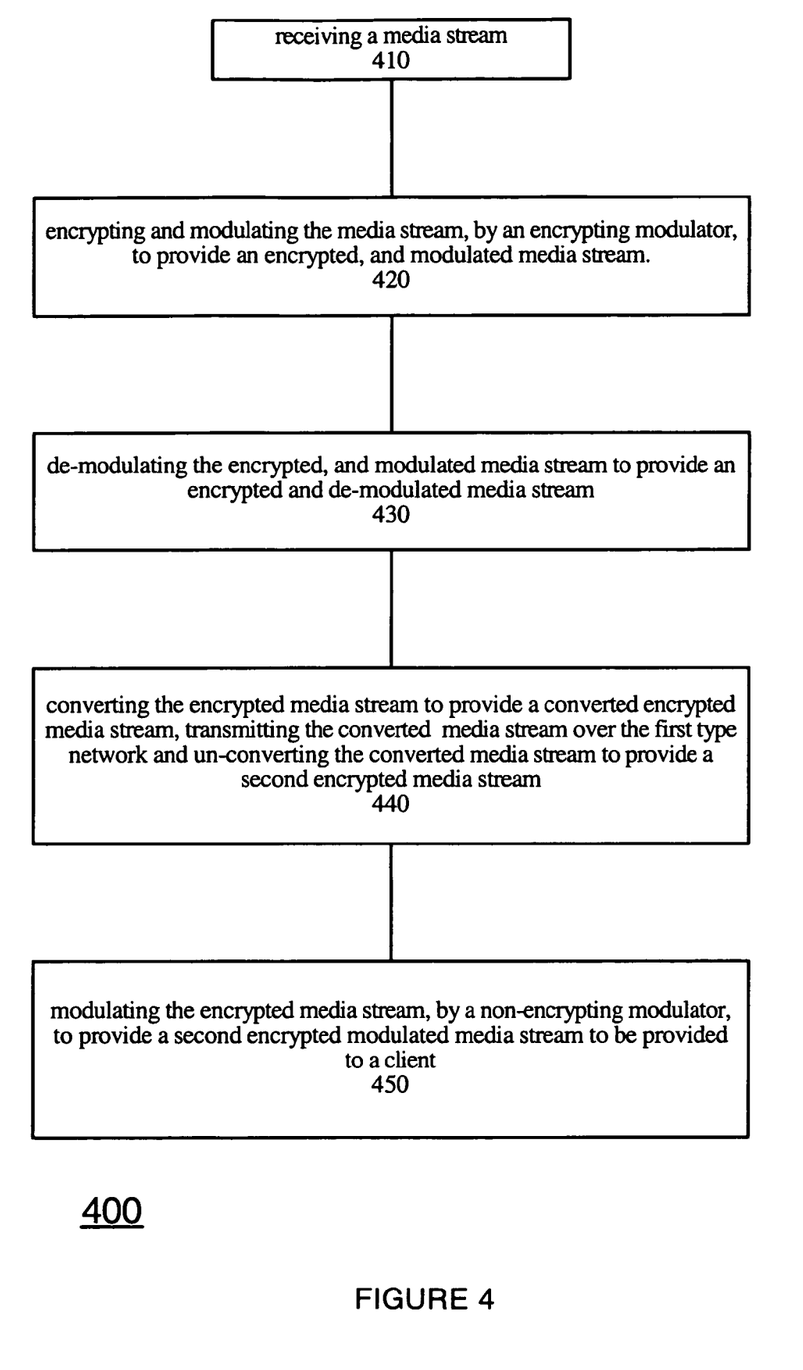
FIGS. 4 and 5 are flow charts illustrating methods for providing encrypted media streams, in accordance with an embodiment of the invention.

Referring to FIG. 4 which is a flow chart of a method 400 for providing encrypted media streams to a client. Method 400 starts by step 410 of receiving a media stream. Referring to the example illustrated by FIGS. 1 and 3, a media stream, such as media stream 220 is provided by a media source 102 to RMP 100.

Step 410 is followed by step 420 of encrypting and modulating the media stream 220, by an encrypting modulator 114, to provide a first encrypted modulated media stream. Referring to the example illustrated by FIGS. 2 and 3, an encrypting QAM 114 receives the media stream 220, retrieved client public keys 224(1)-224(n) and performs said operations to provide QAM modulated encrypted media stream 240 and encrypted program keys 236(1)-236(n). As illustrated by dashed lines, the encrypting QAM modulator 114 can also produce conditional access information. The conditional access information 202 may be provided by the same path as the media streams according to one embodiment of the present invention.

Step 420 is followed by step 430 of demodulating the encrypted modulated media stream 240 to provide an encrypted media stream 244. Referring to the example illustrated by FIGS. 2 and 3, a QAM de-modulator 116 receives the QAM modulated encrypted media stream 240 and provides encrypted media stream 244. It is noted that the encrypted program keys may pass the same path as the media stream according to one embodiment of the present invention.

Step 430 is followed by step 440 of converting the encrypted media stream to provide a converted encrypted media stream 248. Step 440 also involves transmitting the converted encrypted media stream 248 over the first type network 201 and re-converting the converted encrypted media stream 248 to provide an encrypted media stream 244. Referring to the example illustrated by FIGS. 2 and 3 an electro-optical converter 140 that converts encrypted media stream 244 into a converted encrypted media stream 248 that is transmitted over first type network 201 to LMP 301 where it is re-converted by an optical-to-electrical converter to provide encrypted media stream 244.

Step 440 is followed by step 450 of modulating the encrypted media stream 244, by a non-encrypting modulator, into a second encrypted modulated media stream to be provided to a client 10. Referring to the example illustrated by FIG. 3 a non-encrypting QAM receives encrypted media stream 244, and a QAM modulator modulates it into a QAM modulated encrypted media stream 248 that is transmitted over second type network 21 to a client, such as client 10, that uses his encrypted program key to decrypt the program key and then decrypt the media stream.

Figure 5:
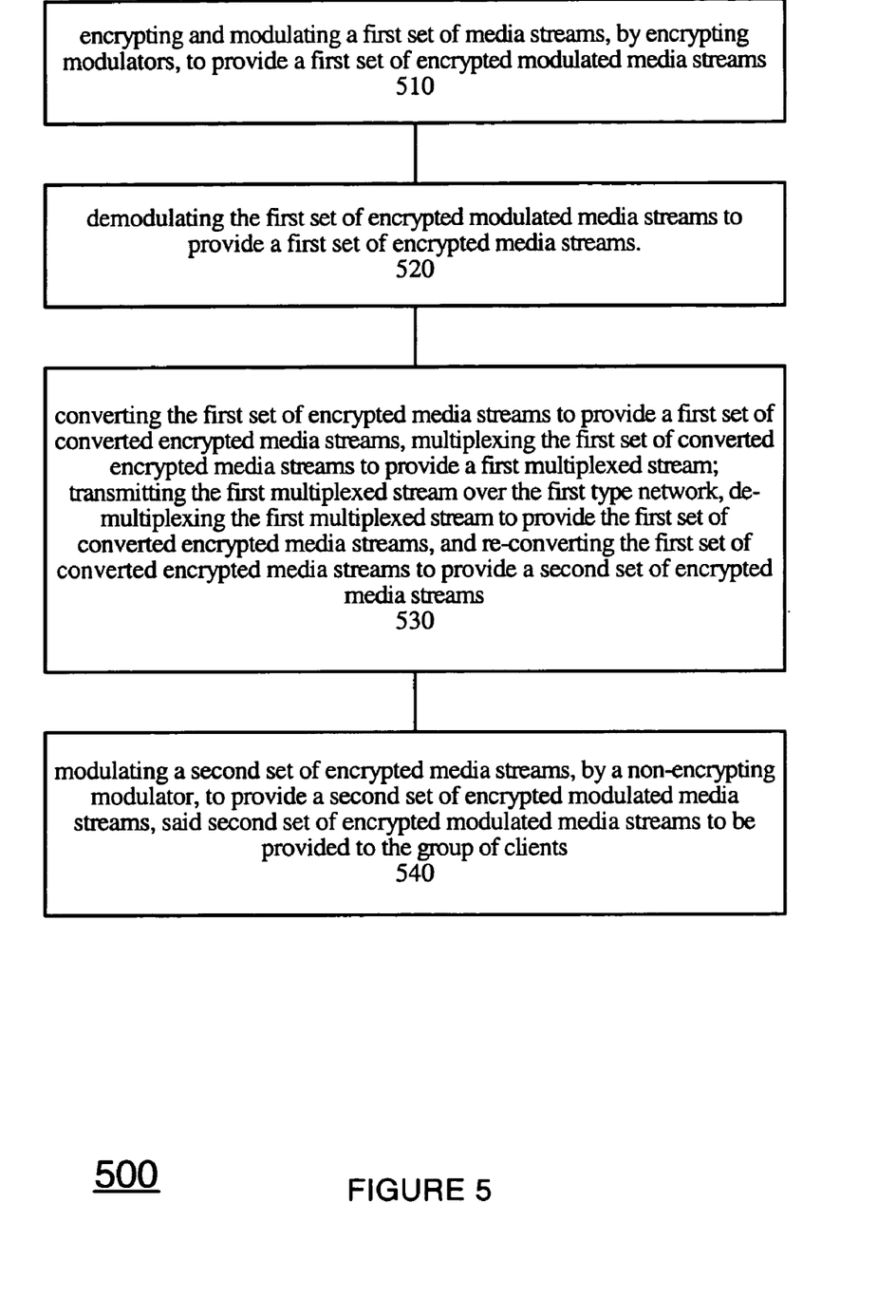

FIG. 5 is a flow chart that illustrates a method 500 for providing encrypted media streams to a group of clients. Method 500 commences with step 510 by encrypting and modulating a first set of media streams. Encrypting modulators provide a first set of encrypted modulated media streams. Referring to the examples of FIGS. 1 and 2 RMP 100 receives multiple (up to hundreds and even more) media streams from multiple media sources 102, where the media streams are routed by router 120 to selected encrypting QAM modulators 114. The media streams are both encrypted and QAM modulated into a first set of encrypted modulated media streams.

Step 510 is followed by step 520 of demodulating the first set of encrypted modulated media streams into a first set of encrypted media streams. Referring to the example illustrated by FIGS. 2 and 3, a first set of media streams are QAM modulated and encrypted by multiple encrypting QAMs 114. Each encrypting QAM receives a media stream and accesses multiple client public keys (the retrieved public keys may correspond to clients that are allowed to decrypt a media stream to clients that belong to a group of clients that are scheduled to receive the encrypted media stream, and the like). Each encrypting QAM is capable of providing a QAM modulated encrypted media stream and encrypted program keys.

Step 520 is followed by step 530 of converting the first set of encrypted media streams into a first set of converted encrypted media streams. Step 530 also involves multiplexing the first set of converted encrypted media streams into a first multiplexed stream; and transmitting the first multiplexed stream over the first type network. Additionally step 530 de-multiplexes the first multiplexed stream into a first set of converted encrypted media streams, and re-converts the first set of converted encrypted media streams into a first set of encrypted media streams.

Step 530 is followed by step 540 of modulating a second set of encrypted media streams, with a non-encrypting modulator, to provide a second set of encrypted modulated media streams. The second set of encrypted modulated media streams are provided to the group of clients. It is noted that the selection of the second set of encrypted media streams may occur prior the conversion (for example, by optical add/drop circuitry) or may occur after the conversion. Referring to the example set forth in previous figures, each LMP 301 may select a subset of the first set of media streams to further provide to its clients. It is further noted that each LMP 301 can replace some or all of the first set of media streams by its other media streams, such as locally provided media streams. It is further noted that each LMP 301 can receive a different set of media streams. An exemplary system and method for selective provisioning of media streams to LMPs and to clients is described in detail at U.S. patent application Ser. No. 09/841, 579 filed 23 Apr. 2001, entitled "Method and System For Providing Multiple Services To End-Users", which is hereby incorporated by reference. Accordingly, while a certain LMP 301 provides a second set of modulated encrypted media streams over a second type network another LMP can provide a third set of modulated encrypted media streams over either another second type network.

The selection of which media streams to provide to clients may be responsive to various parameters such as a client related parameter. Such a parameter may reflect a request of a client to receive a certain encrypted media stream.

According to another embodiment of the invention the encrypting modulators are further adapted to provide a non-encrypted media stream to be provided to the group of clients via the non-encrypting modulators.

It is noted that the conversion includes a modulation of signals according to a modulation scheme that differs from the modulation of signals for transmission over second type networks.

Figure 6:
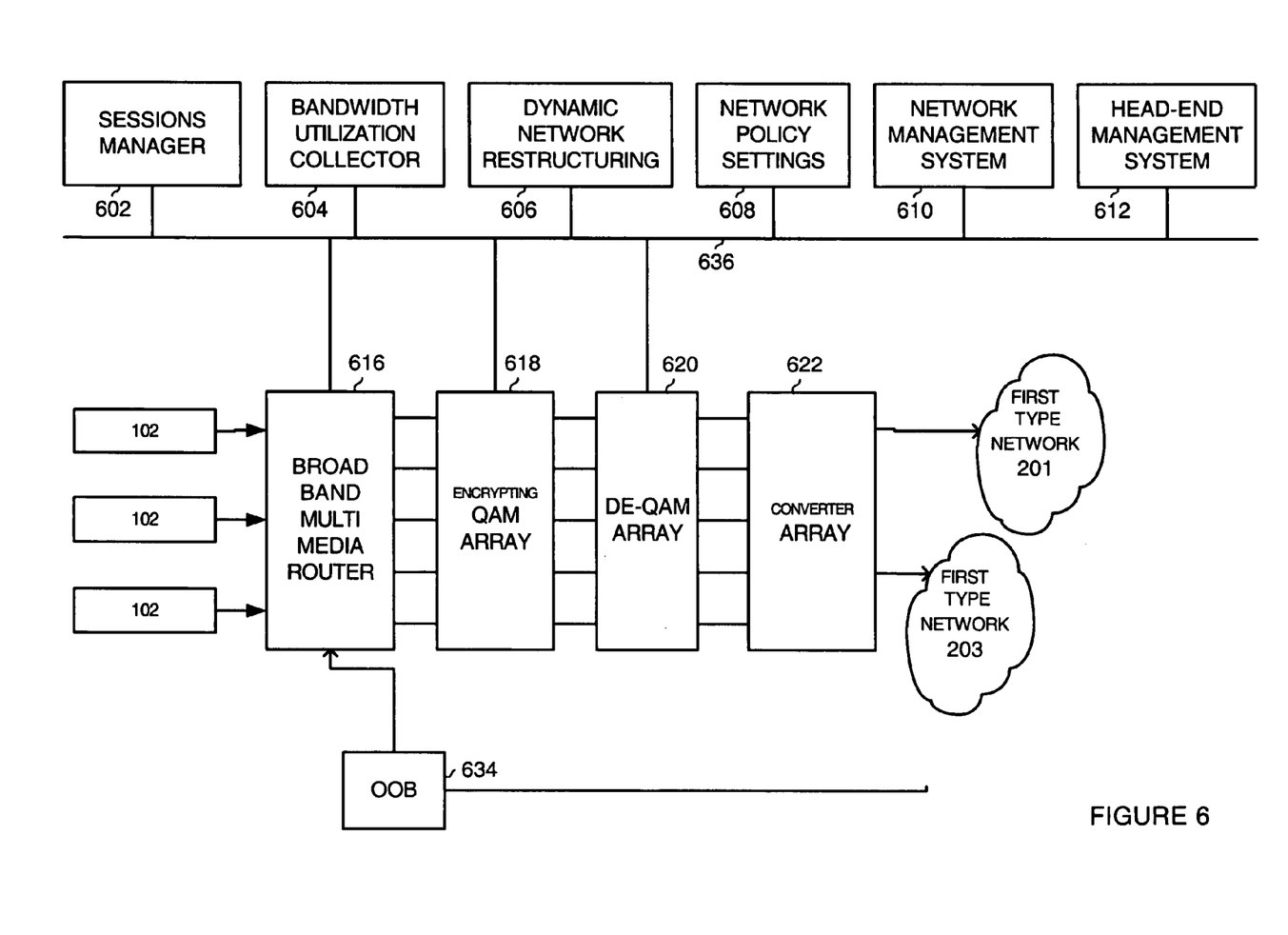
FIG. 6 illustrates a broadband media system, in accordance with an embodiment of the invention.

FIG. 6 illustrates a broadband media system (BMS) in accordance with an aspect of the invention. The BMS of FIG. 6 resembles the broadband media system that is described in U.S. Pat. No. 6,434,141 entitled "Communication management system and method" which hereby is incorporated by reference. However, the present system includes de-modulator arrays and converters instead of RF switch and RF combining arrays.

BMS is functionally located within RMP 100 and includes a logical communication bus 636, a sessions manager unit 602, a bandwidth utilization collector 604, a dynamic network restructuring unit 606, a network policy settings unit 608, a network management system 610, a broadband multimedia router 616, an encrypting QAM array 618, a QAM demodulator array 620, a converter array 622 and an upstream module 634.

The BMS of FIG. 6 is coupled to first type networks 201, 203 and to multiple media sources 102. Sessions manager unit 602, bandwidth utilization collector 604, dynamic network restructuring unit 606, network policy settings unit 608, network management system 610, and head-end management system 612 are connected to the logical communication bus 636. Broadband multimedia router 616 is able to receive multiple media streams and route them to encrypting QAM modulators. Router 616 additionally processes them and provides multiple media streams to encrypting QAM modulators within encrypting QAM modulator array 618. Router 616 is also able to exchange information via upstream module 634. QAM demodulators array 620 is connected to logical communication bus 636, encrypting QAM array 618 and to converter array 622. Upstream module 634 is connected to broadband multimedia router 616, and to multiple clients via first and second type networks.

Sessions manager unit 602 receives and approves session requests, processes them and provides routing parameters to the broadband multimedia router 616. The routing parameters produced by session manager 602 specify input and output routing commands for broadband multimedia router 616, to operate there accordingly. It is noted that a conventional MPEG transport stream does not include routing information such as destination or origin, rather just limited identification information, known as HD (Packet Identification). According to the disclosed technique, each session entering the system has to be approved, and hence can also be denied. The session manager 602 receives session initialization requests from a variety of media sources, such as application servers, end-users, and additional modules. The session manager 602, determines if these requests are compatible with each of a plurality of policy types and available resources, and determines whether or not to approve or deny these requests. According to a preferred embodiment of the invention, one type of session request indicates that a member of a service group requests to view a television channel.

The session manager unit 602 uses bandwidth parameters stored in bandwidth utilization collector 604, regarding the current bandwidth utilization. The session manager 602 accesses network policy settings unit 608, to determine if a selected initialization request conforms to various network policies. A network policy can virtually include any condition, which applies to the content, type, source, destination, network, and the like, which are included in the session initialization request. The session manager further accesses network management system 610, for determining if there are malfunctions in selected parts of the network.

The BMS of FIG. 6 can further include an RF switch (not shown), for connecting each QAM of QAM array 118 to each QAM de-modulator of array 620, and thus, dynamically control the BMS resources. Dynamic network restructuring unit 606 controls each of the QAMs, thereby determining which frequencies that QAM shall modulate to. Dynamic Network Restructuring unit 606 further controls the QAM de modulators array 620.

According to another embodiment of the invention the encrypting QAM is able to output MPEG transport packets, and these signals are converted and transferred over first type and then second type networks.

According to another embodiment of the invention the media streams are provided to encryptors that in turn provide encrypted media streams to the converters.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

I claim:

1. A dual tier distribution method, comprising:
encrypting and modulating, by a plurality of encrypting modulators of a remote media stream manager and provider (RMP), a plurality of source media streams to provide a plurality of encrypted and modulated media streams;
de-modulating, by a plurality of non-decrypting demodulators of the RMP, the plurality of encrypted and modulated media streams to provide a plurality of encrypted and demodulated media streams;
transmitting, to a second tier, the plurality of encrypted and demodulated media streams over multiple high speed networks coupled to multiple ports of the RMP; and wherein the RMP is adapted to determine which encrypted and demodulated media streams to transmit;
modulating the plurality of encrypted and demodulated media streams, by at least one non-encrypting modulator of the second tier, to provide a plurality of second encrypted and modulated media streams; and
transmitting the plurality of second encrypted and modulated media streams to a plurality of clients over a last-mile network;
wherein neither one of the plurality of encrypted and modulated media streams, the plurality of encrypted and demodulated media streams, the plurality of second encrypted and modulated media streams are further encrypted before being transmitted to the plurality of clients.

2. The method of claim 1, wherein wherein at least one encrypting modulator is a broadcast encrypting modulator and at least one encrypting modulator is a narrowcast encrypting modulator.

3. The method of claim 1, further comprising: converting the plurality of encrypted and demodulated media streams to a format associated with the high speed network, wherein converting renders a plurality of converted media streams.

4. The method of claim 3, further comprising: receiving the plurality of converted media streams at a plurality of local multiple media stream manager and provider (LMP) units; un-converting the plurality of converted media streams prior to providing the plurality of second encrypted and modulated media streams.

5. The method of claim 4, wherein the plurality of LMP units include a second plurality of signal converters; a second plurality of non-encrypting modulators coupled to the second plurality of signal converters; and a second plurality of non-decrypting demodulators coupled to the second plurality of non-encrypting modulators.

6. The method of claim 4, further comprising: receiving a plurality of second-tier media streams at the plurality of LMP units; de-modulating the plurality of second-tier media streams to provide a plurality of encrypted second-tier media streams; and transmitting the plurality of encrypted second-tier media streams to the plurality of clients over the last-mile network.

7. The method of claim 6, further comprising: replacing one or more of the plurality of encrypted media streams with one or more of the plurality of encrypted second-tier media streams.

8. The method of claim 1, wherein a number of non-encrypting modulator of the second tier exceeds a number of encrypting modulators of the RMP.

9. A dual tier distribution system, comprising a first tier and a second tier, wherein the first tier comprises:
first tier media sources that provides a plurality of source media streams; and a remote multiple media stream manager and provider (RMP) comprising:
  a plurality of RMP units configured to select the plurality of source media streams;
  multiple encrypting modulators configured to encrypt and modulate the plurality of source media streams and to provide a plurality of encrypted and modulating media streams;
  multiple non-decrypting demodulators configured to demodulate the plurality of encrypted and modulating media streams and to provide a plurality of encrypted and demodulated media streams;
  multiple ports configured to transmit the plurality of encrypted and demodulated media streams over multiple high speed networks to the second tier of the dual tier distribution system;
wherein the second tier further comprises:
  a local multiple media stream manager and provider (LMP) comprising a plurality of LMP units;
  means for receiving the plurality of converted media streams at the plurality of local multiple media stream manager and provider (LMP) units;
  wherein only the multiple encrypting modulators are arranged to perform an encryption operation.

10. The system of claim 9, wherein at least one encrypting modulator is a broadcast encrypting modulators and at least one encrypting modulator is a narrowcast encrypting modulator.

11. The system of claim 9, further comprising: means for converting the plurality of encrypted and demodulated media streams to a format associated with the high speed network, wherein the converting means renders a plurality of converted media streams.

12. The system of claim 11, wherein the second tier further comprising:
  means for receiving the plurality of converted media streams at the plurality of the LMP units;
  means for un-converting the plurality of converted media streams to provide a second plurality of encrypted media streams;
  multiple non-encrypting modulators configured to modulate the second plurality of encrypted media streams to provide a plurality of second encrypted and modulated media streams; and
  means for transmitting the plurality of second encrypted and modulated media streams to a plurality of clients over a last-mile network.

13. The system of claim 12, wherein the plurality of LMP units include a second plurality of signal converter means; a second plurality of non-encrypting modulator means coupled to the second plurality of signal converter means; and a second plurality of non-decrypting demodulator means coupled to the second plurality of non-encrypting modulator means.

14. The system of claim 12, further comprising:
  means for receiving a plurality of second-tier media streams at the plurality of LMP units;
  means for de-modulating the plurality of second-tier media streams to provide a plurality of encrypted second-tier media streams; and
  means for transmitting the plurality of encrypted second-tier media streams to the plurality of clients over the last-mile network.

15. The system of claim 14, further comprising: means for replacing one or more of the plurality of encrypted media streams with one or more of the plurality of encrypted second-tier media streams.

16. The system of claim 15, wherein the LMP further includes a plurality of signal selector means to select one or more signals from the plurality of encrypted media streams and the plurality of encrypted second-tier media streams.

17. A dual tier distribution system, comprising a first tier and a second tier, wherein the first tier comprises:
  a remote multiple media stream manager and provider (RMP) that comprises a plurality of RMP units;
  wherein the RMP is adapted to determine which encrypted and demodulated media streams to transmit and to receive a plurality of source media streams;
  wherein the plurality of RMP units comprise a plurality of encrypting modulators and a plurality of non-decrypting demodulators coupled to the encrypting modulators;
  wherein the plurality of RMP units encrypt the plurality of source media streams to provide a plurality of encrypted media streams; modulate the plurality of encrypted media streams to provide a plurality of encrypted and modulated media streams; de-modulate the plurality of encrypted and modulated media streams to provide a plurality of encrypted and demodulated media streams; and transmit the plurality of encrypted and demodulated media streams to the second tier of the dual tier distribution system, over multiple high speed networks coupled to multiple ports of the RMP; wherein the RMP is adapted to determine which encrypted and demodulated media streams to transmit;
  wherein each media stream of the plurality of source media streams is provided to an encrypting modulator of the plurality of encrypting modulator means in response to a mapping between encrypting modulators of the plurality of encrypting modulator means and clients that are coupled to the RMP; wherein the providing each of the media streams to the respective encrypting modulator is preceded by determining, by a management entity, which media streams are provided to which encrypting modulator and by a configuration of a routing unit of the RMP to support said determination;
  wherein the dual tier distribution system is arranged to perform an encryption only by the plurality of encrypting modulators of the RMP units.

18. The system of claim 17, wherein each RMP unit of the plurality of RMP units comprises: a plurality of encrypting modulators; a plurality of non-decrypting demodulators coupled to the encrypting modulators; a plurality of signal converters coupled to the non-decrypting demodulators; and a selector coupled to the plurality of signal converters.

19. The system of claim 17, wherein the plurality of RMP units convert the plurality of encrypted and demodulated media streams to a format associated with the high speed network, and render a plurality of converted media streams.

20. The system of claim 19, wherein the second tier further comprising:
  a plurality of local multiple media stream manager and provider (LMP) units to receive the plurality of converted media streams; wherein the plurality of LMP units un-convert the plurality of converted media streams to provide a second plurality of encrypted media streams; modulate the second plurality of encrypted media streams to provide a plurality of second encrypted and modulated media streams; and
  transmits the plurality of second encrypted and modulated media streams to a plurality of clients over a last-mile network.

21. The system of claim 20, wherein the plurality of LMP units include a second plurality of signal converters; a second plurality of non-encrypting modulators coupled to the second plurality of signal converters; and a second plurality of non-decrypting demodulators coupled to the second plurality of non-encrypting modulators.

22. The system of claim 20, further comprising: a plurality of second-tier media stream sources connected to the plurality of LMP units, wherein the LMP units receive a plurality of second-tier media streams from the plurality of second-tier media steam sources; de-modulate the plurality of second-tier media streams to provide a plurality of encrypted second-tier media streams; and transmit the plurality of encrypted second-tier media streams to the plurality of clients over the last-mile network.

23. The system of claim 22, wherein the LMP units further replace one or more of the plurality of encrypted media streams with one or more of the plurality of encrypted second-tier media streams.

24. The system of claim 23, wherein the plurality of LMP units further comprise a plurality of signal selectors to select one or more signals from the plurality of encrypted media streams and the plurality of encrypted second-tier media streams.

25. The method according to claim 1, further comprising encrypting a program key by at least one client public key to provide at least one encrypted program key, wherein the program key is used to encrypt a media stream of the plurality of media streams to provide an encrypted media stream; and transmitting the at least one encrypted program key.

26. The system according to claim 9, further comprising means for encrypting a program key by at least one client public key to provide at least one encrypted program key, wherein the program key is used to encrypt a media stream of the plurality of media streams to provide an encrypted media stream, and means for transmitting the at least one encrypted program key.

27. The system according to claim 17, wherein the plurality of RMP units encrypt at least one program key by at least one client public key to provide at least one encrypted program key, wherein each of the at least one program key is used to encrypt a media stream of the plurality of media streams to provide an encrypted media stream; and wherein the plurality of RMP units transmit the at least one encrypted program key.

28. The method according to claim 1, wherein the transmitting is preceded by a stage of splitting an encrypted media stream and feeding it to multiple outputs of the RMP.

29. The method according to claim 1, wherein the transmitting is preceded by a stage of splitting an encrypted and modulated media stream and feeding it to multiple outputs of the RMP.

30. The method according to claim 1, wherein the providing is preceded by duplicating a source media stream and feeding it to multiple encrypting modulators.

31. The method according to claim 1 wherein the multiple high speed networks are selected from a group consisting of: SONET network, WDM network and packet switched WDM network.

32. The system according to claim 17 wherein at least one encrypting modulator is a broadcast encrypting modulator and at least one encrypting modulator is a narrowcast encrypting modulator.

33. The system according to claim 17 wherein a number of non-encrypting modulator of the second tier exceeds a number of encrypting modulators of the RMP.

* * * * *